(12) United States Patent
Taguchi et al.

(10) Patent No.: US 7,594,739 B2
(45) Date of Patent: Sep. 29, 2009

(54) LIGHT SOURCE DEVICE AND PROJECTION-TYPE IMAGE DISPLAY DEVICE

(75) Inventors: Hirokazu Taguchi, Tokyo (JP); Yoshinori Kakuta, Tokyo (JP); Kimito Nishikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 134 days.

(21) Appl. No.: 11/265,081

(22) Filed: Nov. 3, 2005

(65) Prior Publication Data
US 2006/0209543 A1 Sep. 21, 2006

(30) Foreign Application Priority Data
Mar. 16, 2005 (JP) .............................. 2005-074339

(51) Int. Cl.
*B60Q 1/06* (2006.01)
*F21V 29/00* (2006.01)

(52) U.S. Cl. ....................... 362/373; 362/261; 362/264; 362/294; 362/345

(58) Field of Classification Search .................. 362/147, 362/404, 407–408, 650, 261–264, 294, 345, 362/373, 538, 547
See application file for complete search history.

(56) References Cited

U.S. PATENT DOCUMENTS 5,860,719 A * 1/1999 Suzuki et al. ................. 353/61
6,509,674 B1 1/2003 Nakagawa

FOREIGN PATENT DOCUMENTS

| CN | 1261686 A | | 8/2000 |
| JP | 08314011 A | | 11/1996 |
| JP | 10254061 A | * | 9/1998 |
| JP | 2000-36215 | | 2/2000 |

\* cited by examiner

*Primary Examiner*—Sandra L O'Shea
*Assistant Examiner*—Jason Moon Han
(74) *Attorney, Agent, or Firm*—Birch, Stewart, Kolasch & Birch, LLP.

(57) ABSTRACT

A light source device (100) includes a discharge lamp (1), a reflection mirror (2), a transparent plate (3) and a case (7). The reflection mirror (2) has inlet openings (4a, 4b) and outlet openings (5a, 5b) formed in the vicinity of the front end of the reflection mirror (2). The case (7) has outlet openings (7a, 7b) disposed on the front side of the reflection mirror (2), and an inlet opening (7c) disposed on the rear side of the reflection mirror (2). The inlet opening (7c) of the case (7) allows an air to flow into the case (7) and to flow along a back surface (2b) of the reflection mirror (2). The inlet openings (4a, 4b) of the reflection mirror (2) allow the air to flow into the interior of the reflection mirror (2). The outlet openings (5a, 5b) of the reflection mirror (2) and the outlet openings (7a, 7b) of the case (7) allow the air to be exhausted out of the case (7).

7 Claims, 6 Drawing Sheets

LIGHT SOURCE DEVICE AND PROJECTION-TYPE IMAGE DISPLAY DEVICE

BACKGROUND OF THE INVENTION

This invention relates to a light source device having a discharge lamp used in a projection-type image display device or the like, and relates to the projection-type image display device using the light source device.

A light source device of an projection-type image display device includes a discharge lamp, a reflection mirror and a transparent plate. The discharge lamp, the reflection mirror and the transparent plate are housed in a case, and configured as one unit. Recently, in order to project a vivid image even in a well-lighted room, an output of the discharge lamp increases, and therefore it is demanded to enhance a cooling efficiency of the discharge lamp. Consequently, it is proposed to cool the discharge lamp by introducing the air into the interior of a reflection mirror through a cutout portion formed on the reflection mirror, as disclosed in, for example, Japanese Patent Publication No. HEI 8-314011 (see page 2 and FIG. 7).

FIG. 7 is a sectional view of a light source device disclosed in the above described publication. In the light source device, an exhaust fan 109 is provided on the rear side of a case 107 in which a discharge lamp 101 and a reflection mirror 102 are housed. When the exhaust fan 109 operates, the exhaust fan 109 causes the air to flow into the interior of the case 107 through the inlet opening 197a. The air flows through the interior of the case 107, and is discharged out of the case 107 through the bottom of the case 107. However, in such a cooling arrangement, a small amount of air flows along the rear side of the reflection mirror 102, and therefore it is difficult to sufficiently cool a rear part 101b of the discharge lamp 101 that protrudes rearward from the reflection mirror 102. Since the rear part 101b of the discharge lamp 101 highly influences the lifetime of the discharge lamp 101, it is demanded to solve this problem. Furthermore, since the difference in temperature between a reflection surface and a back surface of the reflection mirror 102 tends to be large, there is a possibility that the reflection mirror 102 may be broken.

SUMMARY OF THE INVENTION

An object of the present invention is to efficiently and entirely cool a discharge lamp and a reflection mirror.

According to the invention, there is provided a light source device including a discharge lamp and a reflection mirror that reflects a light from the discharge lamp and emits the light. The reflection mirror has a reflection surface and a back surface opposite to reflection surface. The light source device further includes a transparent plate disposed on a light emitting side of the reflection mirror. The transparent plate and the reflection mirror are configured to surround a space. The light source device includes a case that houses the discharge lamp, the reflection mirror and the transparent plate. The case has an inlet opening and an outlet opening. The reflection mirror has an inlet opening and an outlet opening formed in the vicinity of an end closer to the transparent plate. The inlet opening of the case allows an air to flow into the case and to flow along the back surface of the reflection mirror. The inlet opening of the reflection mirror allows the air to flow into the space. The outlet opening of the reflection mirror and the outlet opening of the case allow the air to be exhausted out of the case.

With such an arrangement, the air introduced into the interior of the case of the light source device flows along the back surface of the reflection mirror, and therefore the back surface of the reflection mirror and a protruding portion of the discharge lamp (protruding from the back surface of the reflection lamp) can be cooled. Furthermore, the air is introduced into the interior of the reflection mirror via the inlet opening of the reflection mirror and is exhausted out of the case via the outlet opening of the reflection mirror and the outlet opening of the case, and therefore the discharge lamp and the reflection surface of the reflection mirror can be cooled. Since the discharge lamp and the reflection mirror can be entirely cooled, it is possible to lengthen the lifetime of the discharge lamp. Moreover, the difference in temperature between the reflection surface and the back surface of the reflection mirror can be reduced, and therefore it is possible to prevent the breakage of the reflection mirror (that may occur when the temperature difference is large).

In a particular arrangement, the outlet opening and the inlet opening of the case are provided with members (for example, mesh members) allowing the passage of air and preventing the passage of broken pieces of the discharge lamp. With such an arrangement, even when the discharge lamp is broken, it is possible to prevent the broken pieces of the discharge lamp from scattering out of the case. Further, during the operation of the replacement of the discharge lamp as well as the case, it is possible to prevent the broken pieces of the discharge lamp from being fallen out of the case through the inlet opening and the outlet opening.

DETAILED DESCRIPTION OF THE PREFERRED EMBODIMENT

Embodiments of the present invention will be described with reference to the attached drawings.

Embodiment 1

Figure 1:
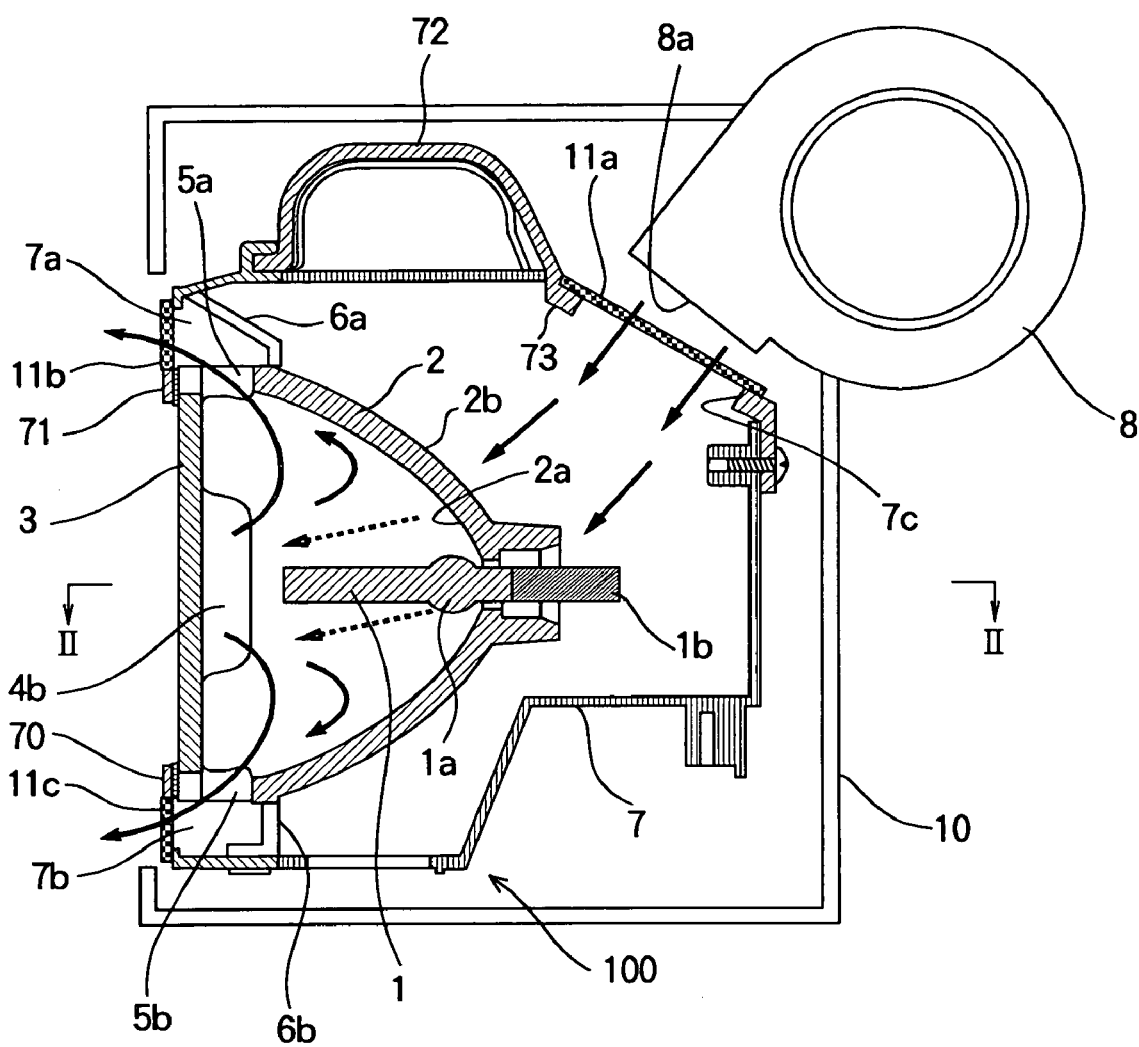
FIG. 1 is a vertical sectional view of a light source device according to Embodiment 1 of the present invention.
Figure 2:
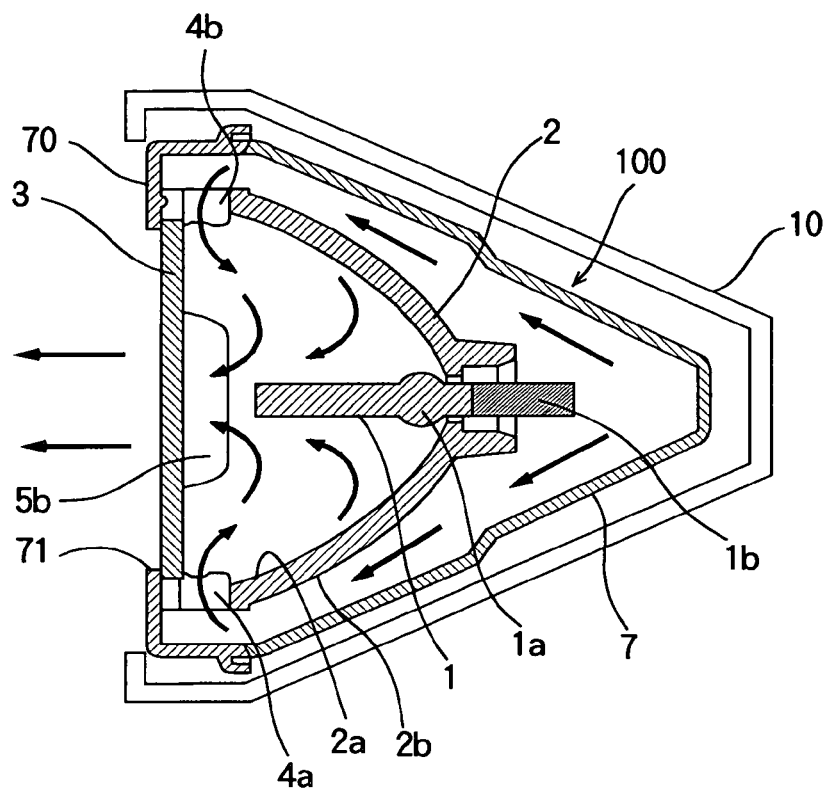
FIG. 2 is a sectional view of the light source device according to Embodiment 1, taken along line II-II shown in FIG. 1.
Figure 3:
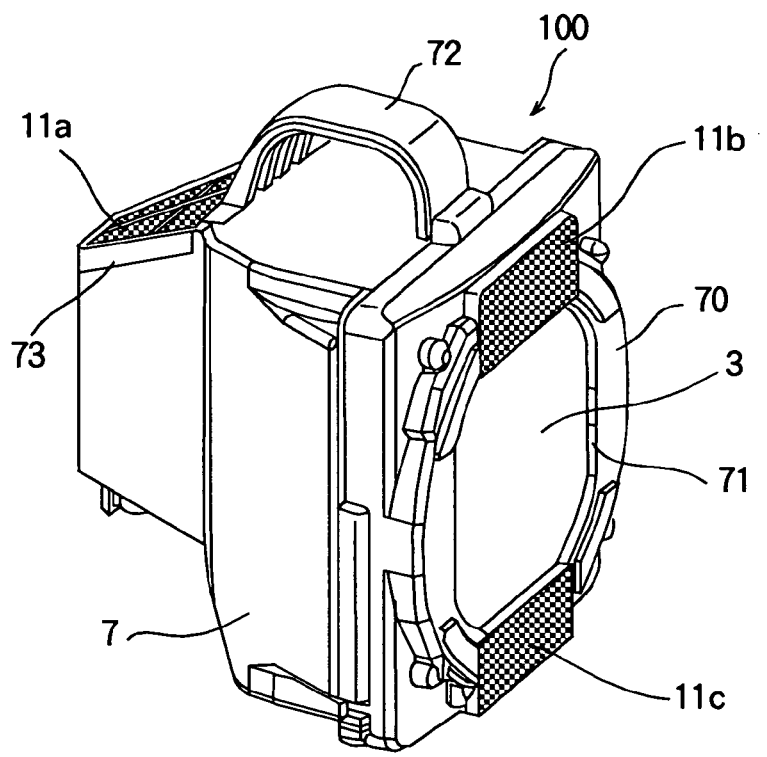
FIG. 3 is a perspective view showing the light source device according to Embodiment 1 of the present invention.

FIG. 1 is a vertical sectional view of a light source device 100 according to Embodiment 1 of the present invention. FIG. 2 is a sectional view of the light source device 100 taken along line II-II shown in FIG. 1. FIG. 3 is a perspective view showing the light source device 100 shown in FIG. 1. The light source device 100 is used in, for example, a projection-type image display device (FIG. 6) described later.

As shown in FIG. 1, the light source device 100 includes a discharge lamp 1 elongated in one direction. The discharge lamp 1 is composed of, for example, a metal halide lamp or xenon lamp. The light source device 100 further includes a reflection mirror 2 that reflects a divergent light emitted by the discharging lamp 1 and emits the light in the left in FIG. 1. The reflection mirror 2 is in the form of a body of rotation whose center is aligned with a center axis of the discharge lamp 1. The light emitting side (i.e., the left side in FIG. 1) of the reflection mirror 2 is opened. A transparent plate 3 that transmits the light is provided on an end of the light emitting side (i.e., an opening) of the reflection mirror 2.

Hereinafter, the left side in FIG. 1 (i.e., the light emitting side of the discharge lamp 1 and the reflection mirror 2) is defined as "front", and the right side in FIG. 1 is defined as "rear". The upward and downward directions in FIG. 1 are respectively defined as "upward" and "downward". Moreover, "left" and "right" are defined along the direction perpendicular to a paper of FIG. 1.

The reflection mirror 2 includes a reflection surface 2a that reflects the light emitted by the discharge lamp 1, and a back surface opposite to the reflection surface 2a. A space surrounded by the reflection mirror 2 and the transparent plate 3 is a substantially closed space, in which an arc tube 1a of the discharge lamp 1 is disposed. A rear end portion 1b of the discharge lamp 1 projects rearward from the back surface 2b of the reflection mirror 2.

A pair of inlet openings 4a and 4b (the inlet opening 4a is shown in FIG. 2) and a pair of outlet openings 5a and 5b are formed on the front end of the reflection mirror 2. As shown in FIG. 2, the inlet openings 4a and 4b are disposed respectively on left and right sides of the transparent plate 3. As shown in FIG. 1, the outlet openings 5a and 5b are disposed respectively on upper and lower sides of the transparent plate 3. The inlet openings 4a and 4b and the outlet openings 5a and 5b are made of, for example, cutout portions formed on the front end of the reflection mirror 2.

The light source device 100 includes a case 7 that houses the discharge lamp 1, the reflection mirror 2 and the transparent plate 3. An opening 71 is formed on a front panel 70 of the case 7, which corresponds to the transparent plate 3 of the discharge lamp 1. A grip portion 72 is formed on the upper side of the case 7. The grip portion 72 is held by a user when the user carries the light source device 100.

A pair of outlet openings 7a and 7b are formed on upper and lower parts of the front panel 70 of the case 7. The outlet openings 7a and 7b are disposed on upper and lower sides with respect to the opening 71. The outlet openings 7a and 7b are formed respectively in the vicinities of the outlet openings 5a and 5b of the reflection mirror 2. A conduit 6a is provided between the outlet opening 7a of the case 7 and the outlet opening 5a of the reflection mirror 5. The conduit 6a introduces the exhausted air from the outlet opening 5a to the outlet opening 7a. A conduit 6b is provided between the outlet opening 7b of the case 7 and the outlet opening 5b of the reflection mirror 5. The conduit 6b introduces the exhausted air from the outlet opening 5b to the outlet opening 7b.

An inclined portion 73 is formed on the top of the rear portion of the case 7. The inclined portion 73 is inclined with respect to the horizontal surface. An inlet opening 7c is formed on the inclined portion 73. The inlet opening 7c is provided for introducing the air blown by an air blow fan 8 (described later) into the interior of the case 7.

The inlet opening 7c and the outlet openings 7a and 7b are covered by mesh members 11a, 11b and 11c. The mesh members 11a, 11b and 11c are made of, for example, metal. The mesh members 11a, 11b and 11c are provided for prevent broken glass pieces from scattering out of the case 7 when the discharge lamp 1 is broken. Each of the mesh members 11a, 11b and 11c has a mesh size that allows the passage of the air and prevents the passage of the broken pieces of the discharge lamp 1.

A housing 10 is provided in the projection-type image display apparatus (FIG. 6) described later, and the housing 10 surrounds the case 7 of the light source device 100. The above described air blow fan 8 is mounted on the housing 10 in such a manner that an air blow opening 8a of the air blow fan 8 opposes the inlet opening 7c of the case 7 of the light source device 100. The air blow fan 8 blows the air in the direction from the upper surface of the rear portion of the case 7 (i.e., the inlet opening 7c) to the back surface 2b of the reflection mirror 2 and the rear end portion 1b of the discharge lamp 1.

When the air blow fan 8 is rotated, the air blown by the air blow fan 8 is introduced into the interior of the case 7 through the inlet opening 7c. The air flows along the back surface 2b of the reflection mirror 2 and the rear end portion 1b of the discharge lamp 1 toward the front part of the case 7 (FIG. 2). With this, the back surface 2b of the reflection mirror 2 and the rear end portion 1b of the discharge lamp 1 are cooled. Further, at the front part of the case 7, the air is introduced in the interior of the reflection mirror 2 (i.e., a space surrounded by the reflection mirror 2 and the transparent plate 3) through the inlet openings 4a and 4b in the vicinity of the front end of the reflection mirror 2. With this, the reflection surface 2a of the reflection mirror 2 and the arc tube 1a of the discharge lamp 1 are cooled. After the air cools the interior of the reflection mirror 2, the air passes the outlet openings 5a and 5b of the reflection mirror 2 and conduits 6a and 6b, and is exhausted out of the case 7 through the outlet openings 7a and 7b.

Thus, according to Embodiment 1, the air introduced into the case 7 through the inlet opening 7c flows along the rear end portion 1b of the discharge lamp 1 and the back surface 2b of the reflection mirror 2, and therefore it is possible to cool the rear end portion 1b of the discharge lamp 1, as well as the arc tube 1a of the discharge lamp 1. Thus, the lifetime of the discharge lamp 1 can be lengthened. Moreover, the difference in temperature between the reflection surface 2a and the back surface 2b of the reflection mirror 2 can be reduced, and therefore it is possible to prevent the breakage of the reflection mirror 2 (that may occur when the temperature difference is large).

Moreover, the exhausted air from the outlet openings 5a and 5b of the reflection mirror 2 is directly exhausted out of the case 7 via the conduits 6a and 6b, and therefore the heated air (absorbing the heat in the interior of the reflection mirror 2) does not repeatedly circulate the interior of the reflection mirror 2. As a result, it is ensured that the air introduced into the interior of the reflection mirror 2 (via the inlet openings 4a and 4b from the back surface 2b) is an outside air blown by the air blow fan 8. Therefore, it is possible to efficiently cool the discharge lamp 1 and the reflection mirror 2.

Figure 7:
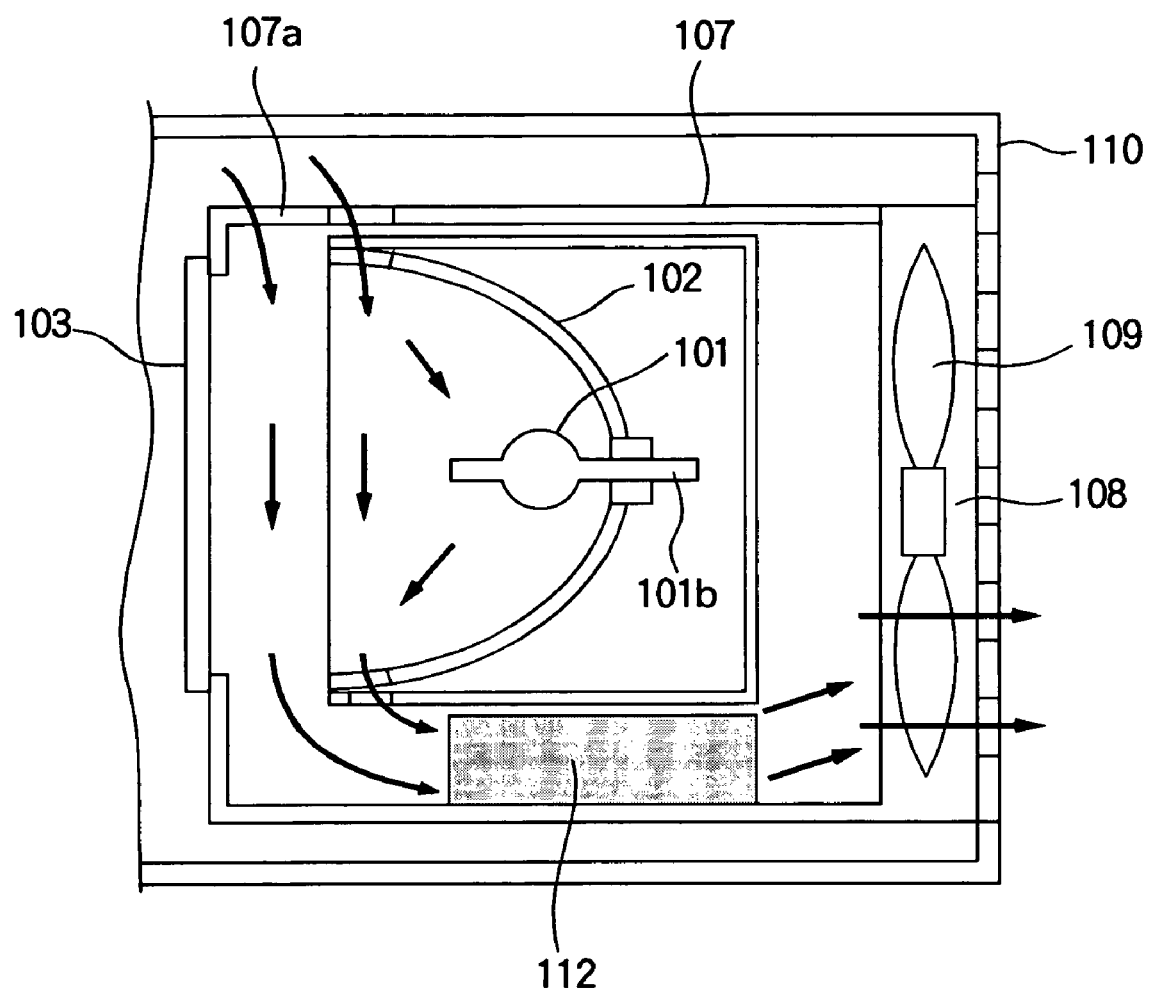
FIG. 7 is a vertical sectional view showing a conventional light source device.

Furthermore, in the above described conventional light source device (FIG. 7), a V-shaped barrier 112 is provided on the bottom of a case 107 for preventing the broken pieces of a discharge lamp 101 from being scattering out of the case 107 through an outlet opening 108 when the discharge lamp 101 is broken. However, there is a possibility that the broken pieces of the discharge lamp 101 may be scattered out of the case 107 through an inlet opening 107a due to the momentum of breakage of the discharge lamp 101. Further, if the case 107 is tilted during an operation of replacement of the discharge lamp 101 (as well as the case 107), there is a possibility the broken pieces of the discharge lamp 101 may be fallen out of the case 107 through the inlet opening 107a.

In contrast, according to Embodiment 1, the mesh members 11a, 11b and 11c are provided on the inlet opening 7c and the outlet openings 7a and 7b of the case 7, and therefore it is possible to prevent the broken glass pieces from scattering out of the case 7 even when the discharge lamp 1 is broken. Further, during the operation of replacement of the discharge lamp 1 (as well as the case 7), it is possible to prevent the broken pieces of the discharge lamp 1 from being fallen out of the case 7, even if the case 7 is tilted.

Additionally, in Embodiment 1, the air blow fan 8 is disposed on the rear side of the reflection mirror 2, and the inlet opening 7c opposes the back surface 2b of the reflection mirror 2, and therefore a sufficient amount of air can flow along the back surface 2b of the reflection mirror 2 and the rear end portion 1b of the discharge lamp 1, so that the back surface 2b of the reflection mirror 2 and the rear end portion 1b of the discharge lamp 1 can be efficiently cooled. Furthermore, the outlet openings 7a and 7b are disposed in the vicinities of the outlet openings 5a and 5b of the reflection mirror 2, and therefore the heated air (absorbing the heat in the interior of the reflection mirror 2) can be immediately exhausted out of the case 7.

The positions of the outlet openings 5a and 5b and inlet openings 4a and 4b of the reflection mirror 2 can be appropriately changed, as long as a smooth air flow inside and outside the reflection mirror 2 can be ensured. The positions of the outlet openings 7a and 7b of the case 7 can be so determined that the outlet openings 7a and 7b introduce the exhausted air from the outlet openings 5a and 5b of the reflection mirror 2 to the exterior of the case 7. The position of the inlet opening 7c of the case 7 can be so determined that the inlet opening 7c introduces the air blown by the air blow fan 8 to the front part of the reflection mirror 2 via the back surface 2b of the reflection mirror 2 and the rear end portion 1b of the discharge lamp 1.

Embodiment 2

Figure 4:
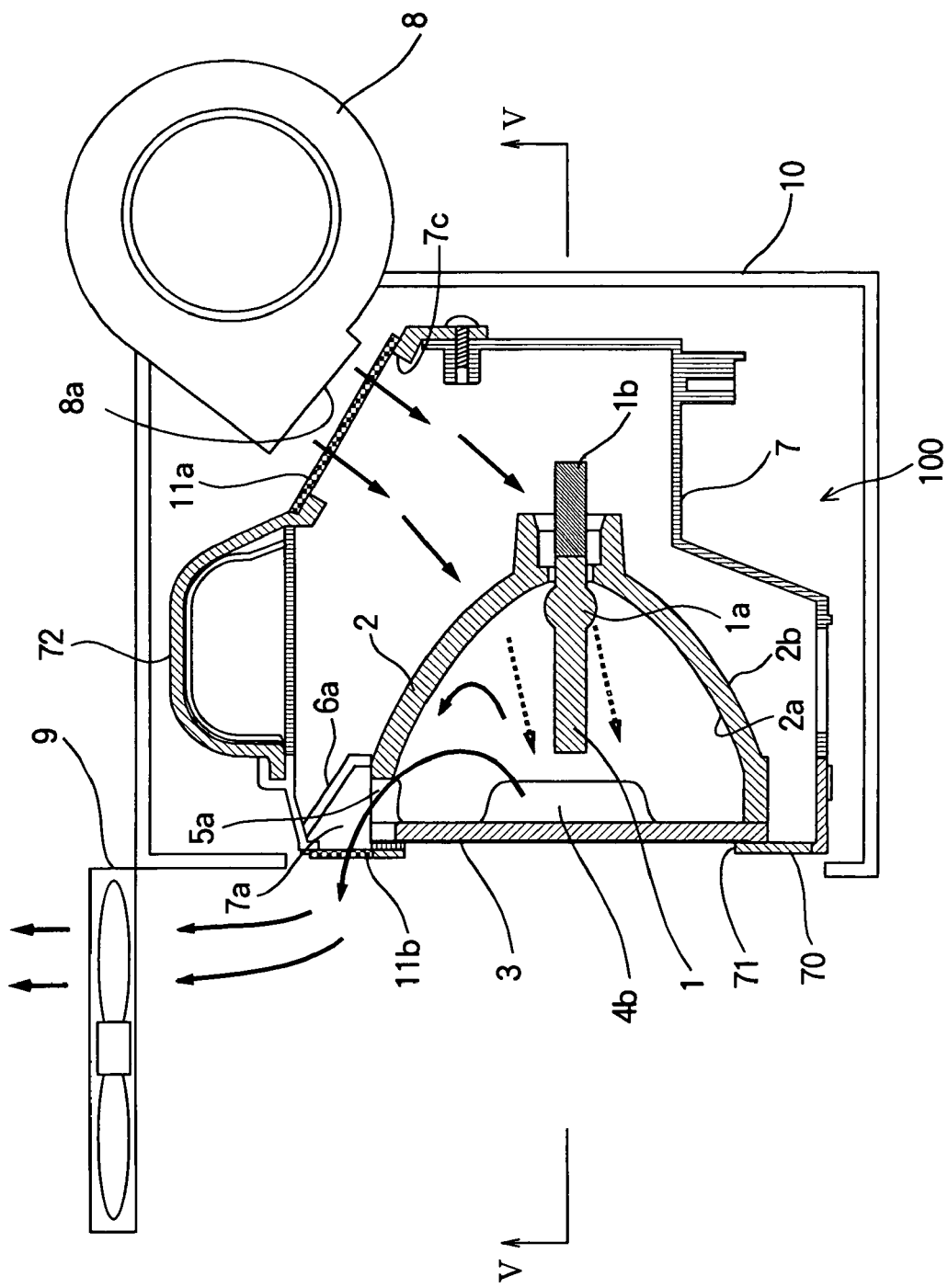
FIG. 4 is a sectional view showing a light source device according to Embodiment 2 of the present invention.
Figure 5:
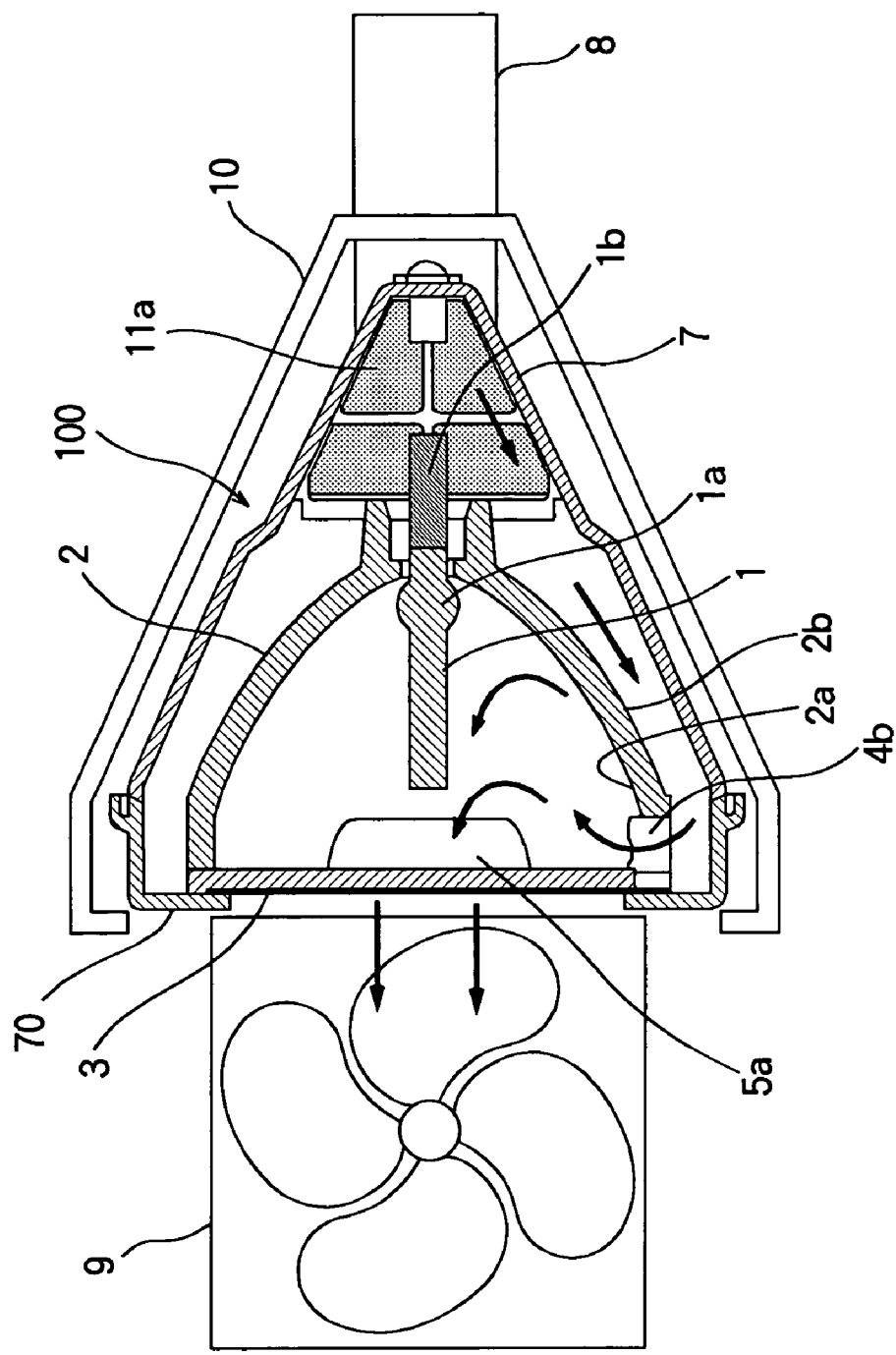
FIG. 5 is a sectional view of the light source device according to Embodiment 2, taken along line V-V shown in FIG. 4.

FIG. 4 is a vertical sectional view of a light source device 100 of Embodiment 2 of the present invention. FIG. 5 is a sectional view of the light source device 100 taken along line V-V shown in FIG. 4.

In the above described Embodiment 1, the reflection mirror 2 has two inlet openings 4a and 4b and two outlet openings 5a and 5b. Conversely, in Embodiment 2, the reflection mirror 2 has only one inlet opening 4b and only one outlet opening 5a. The case 7 has an inlet opening 7c as was described in Embodiment 1 and one outlet opening 7a corresponding to the outlet opening 5a of the reflection mirror 2.

In Embodiment 2, in addition to the air blow fan 8 described in Embodiment 1, an exhaust fan 9 is provided on the upper front of the housing 10, for compulsorily exhausting the air from the outlet opening 5a of the reflection mirror 2 and the outlet opening 7a of the case 7. The exhaust fan 9 is mounted on the housing 10 in such a manner that the exhaust fan 9 is disposed on the upper front position with respect to the case 7 of the light source device 100. The exhaust fan 9 blows the air in an upward vertical direction (i.e., from the lower side to the upper side).

In Embodiment 2, components other than the inlet opening 4b and the outlet opening 5a of the reflection mirror 2, the outlet opening 7a of the case 7 (as well as the conduit 6a) and the exhaust fan 9 are the same as those of Embodiment 1. The light source device 100 of Embodiment 2 is used in the projection-type image display device (FIG. 6) described later, as in Embodiment 1.

When the air blow fan 8 is rotated, the air blown by the air blow fan 8 is introduced into the interior of the case 7 through the inlet opening 7c. The air flows along the back surface 2b of the reflection mirror 2 and the rear end portion 1b of the discharge lamp 1 toward the front part of the case 7 (FIG. 5). With this, the back surface 2b of the reflection mirror 2 and the rear end portion 1b of the discharge lamp 1 are cooled. Further, at the front part of the case 7, the air is introduced into the interior of the reflection mirror 2 through the inlet opening 4b in the vicinity of the front end of the reflection mirror 2. With this, the reflection surface 2a of the reflection mirror 2 and the arc tube 1a of the discharge lamp 1 are cooled. After the air cools the interior of the reflection mirror 2, the air passes the outlet opening 5a of the reflection mirror 2 and the conduit 6a, and is exhausted out of the case 7 through the outlet opening 7a.

As described above, in Embodiment 2, the air blow fan 8 and the exhaust fan 9 force the air to flow in the interior and outside of the case 7, and therefore the number of the inlet opening 4b and the outlet opening 5a of the reflection mirror 2 can be reduced. Therefore, it is possible to reduce the number of the paths through which the broken glass pieces are directed toward the exterior of the reflection mirror 2 (i.e., the interior of the case 7) when the discharge lamp 1 is broken. As a result, it is possible to confine a majority of the broken pieces of the discharge lamp 1 in the interior of the reflection mirror 2.

Furthermore, as was described in Embodiment 1, the heated air that absorbs the heat in the reflection mirror 2 is directly exhausted to the exterior of the case 7, and does not circulate in the case 7. Since the heated air does not repeatedly circulate in the case 7, the discharge lamp 1 and the reflection mirror 2 can be efficiently cooled.

Moreover, the mesh members 11a and 11b are provided on the inlet opening 7c and the outlet opening 7a of the case 7, and therefore it is possible to prevent the broken pieces of the discharge lamp 1 from scattering out of the case 7 even when the discharge lamp 1 is broken. Further, during the operation of replacement of the discharge lamp 1 (as well as the case 7), it is possible to prevent the broken pieces of the discharge lamp 1 from being fallen out of the case 7 through the inlet opening 7c and the outlet opening 7a.

In this embodiment, as long as the reflection mirror 2 has at least one inlet opening and at least one outlet opening, the number of the inlet opening and the number of the outlet opening are not limited. The positions of the inlet opening and the outlet opening can be appropriately changed. In this regard, it is preferable that the number of inlet opening and the number of outlet opening are the same, so that the amount of the air introduced into the interior of the reflection mirror 2 and the amount of the air exhausted out of the reflection mirror 2 are substantially the same.

Figure 6:
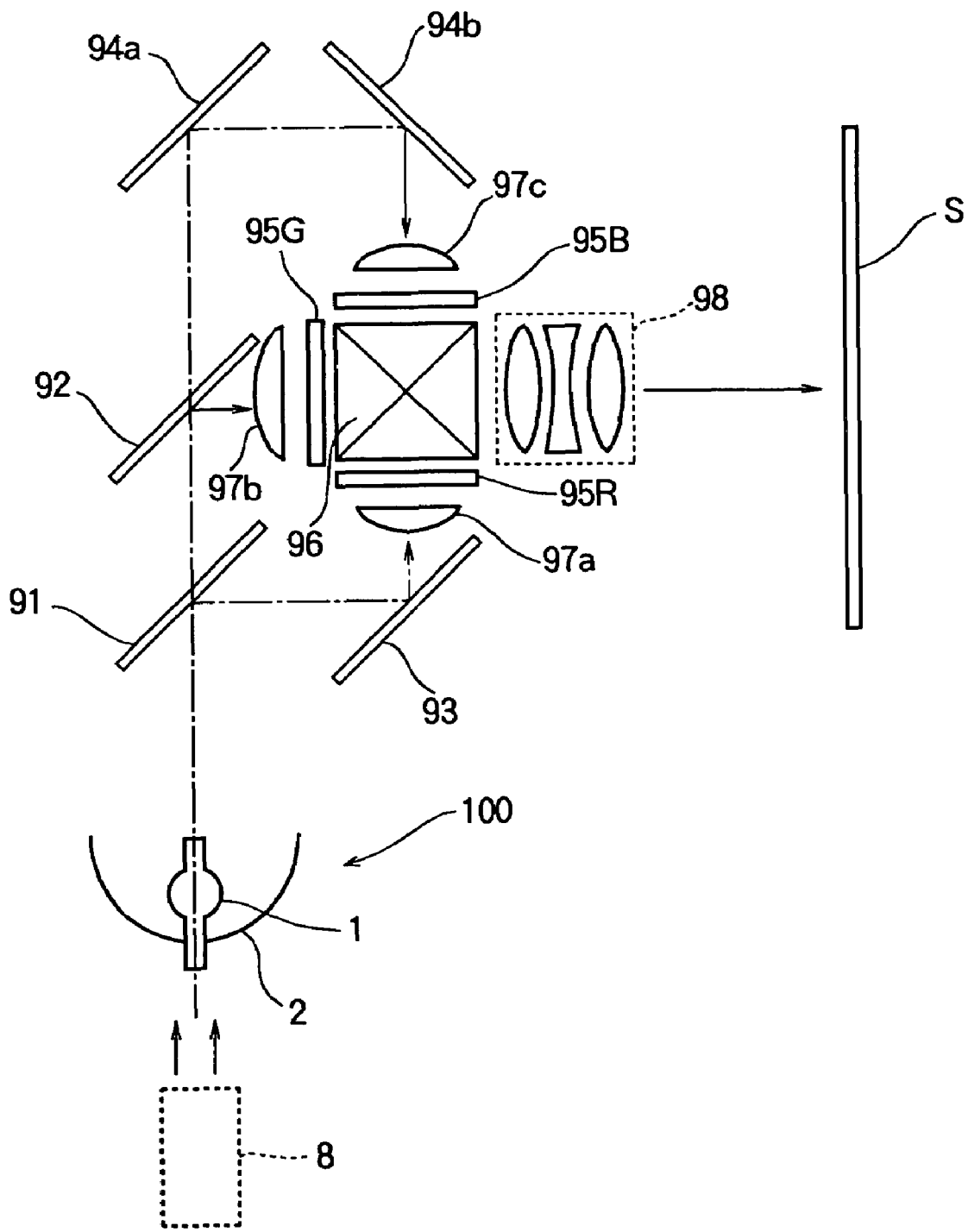
FIG. 6 is a view showing an example of a configuration of a projection-type image display device in which the light source devices according to Embodiments 1 and 2 can be used.

A projection-type image display device in which the light source device 100 according to Embodiment 1 or 2 can be mounted will be described. FIG. 6 shows an example of the reflection-type image display device in which the above described light source device 100 is mounted. It goes without saying that the light source device 100 can be mounted in devices other than the reflection-type image display device shown in FIG. 6 as an example.

The reflection-type image display device shown in FIG. 6 includes the above described light source device 100, and dichroic mirrors 91 and 92 that separate the incident white light (emitted by the light source device 100) into lights of red (R), green (G) and blue (B). The reflection-type image display device further include three LCD (liquid crystal display) light bulbs 95R, 95G and 95B that modulate the lights of the respective colors, a prism unit 96 that synthesize. the modulated lights of the respective colors, and a projection optical system 98 that projects the synthesized light onto the screen S in an enlarged scale. Further, the reflection-type image display device includes a mirror 93 that introduces the red light (reflected by the dichroic mirror 91) to the LED light bulb 95R, and mirrors 94a and 94b that introduce the blue light (that has passed through the dichroic mirror 91) to the LED light bulb 95B. Condenser lenses 97a, 97b and 97c are disposed on the incident sides of the LCD light bulb 95R, 95G and 95B, which parallelize the incident lights to be incident on the respective light bulbs 95R, 95G and 95B.

The light emitted by the light source device 100 is incident on the dichroic mirror 91. The red light is reflected by the dichroic mirror 91, and is incident on the LCD light bulb 95R via the reflection mirror 93 and the condenser lens 97a. The blue and yellow lights having passed though the dichroic mirror 91 is incident on the dichroic mirror 92. The green light is reflected by the dichroic mirror 92, and is incident on the LCD light bulb 95G via the condenser lens 97b. The blue light having passed the dichroic mirror 92 is incident on the LCD light bulb 95B via the mirrors 94a and 94b and the condenser lens 97c. The lights incident on the LCD light bulbs 95R, 95G and 95B are modulated according to the image information of respective colors, and synthesized by the prism unit 96. The synthesized light is projected onto the screen S by the projection optical system 98.

As described above, even when the discharge lamp 1 in the light source device 100 is broken, the mesh members 11a through 11c (FIG. 1) prevent the broken pieces of the discharge lamp 1 from scattering outside the case 7. Therefore, it is possible to prevent the broken glass pieces from scattering in the projection-type image display device.

While the preferred embodiments of the present invention have been illustrated in detail, it should be apparent that modifications and improvements may be made to the invention without departing from the spirit and scope of the invention as described in the following claims.

What is claimed is:

1. A light source device comprising:
   a discharge lamp;
   a reflection mirror that reflects a light from said discharge lamp and emits said light, said reflection mirror having an inner reflection surface and an outer back surface opposite to said inner reflection surface;
   a transparent plate disposed on a light emitting side of said reflection mirror, said transparent plate and said reflection mirror being configured to surround a space, where said reflection mirror has an inlet opening and an outlet opening, both of which being located in the vicinity of an end of said reflection mirror closer to said transparent plate;
   a case that houses said discharge lamp, said reflection mirror and said transparent plate, said case having an inlet opening formed on a rear side of said case and an outlet opening formed on a front wall of said case, said front wall being disposed on the light emitting side of said reflection mirror and said outlet opening directly opening to the outside of said case; and
   a conduit provided so as to connect said outlet opening of said reflection mirror and said outlet opening of said case;
   wherein air flows from said inlet opening of said case, toward said front wall of said case along said outer back surface of said reflection mirror, through said inlet opening of said reflection mirror into said space, out of said space through said outlet opening of said reflection mirror, through said conduit, and through said outlet opening formed on the front wall of said case directly to the outside of said case.

2. The light source device according to claim 1, wherein said outlet opening and said inlet opening of said case are provided with members allowing the passage of air and preventing the passage of broken pieces of said discharge lamp.

3. The light source device according to claim 1, wherein said inlet opening of said case is formed in opposition to said outer back surface of said reflection mirror.

4. The light source device according to claim 1, wherein said outlet opening of said case is formed in the vicinity of said outlet opening of said reflection mirror.

5. An projection-type image display device comprising:
   said light source device according to claim 1;
   a projection optical system that modulates said light emitted by said light source device and projects said light on a screen, and
   an air blow fan that introduces said air into said case through said inlet opening of said case of said light source device.

6. The projection-type image display device according to claim 5, wherein said air blow fan is disposed on an opposite side to a light emitting side of said light source device.

7. The projection-type image display device according to claim 6, further comprising another fan on said light emitting side of said light source device.

* * * * *